Patented Apr. 15, 1952

2,592,586

UNITED STATES PATENT OFFICE 2,592,586

TRIHYDROXY STEROID ADDUCTS

Paul E. Marlatt, Arthur R. Hanze, A Vern McIntosh, Jr., and Robert H. Levin, Kalamazoo, Mich., assignors to The Upjohn Company, Kalamazoo, Mich., a corporation of Michigan No Drawing. Application February 16, 1951, Serial No. 211,442

12 Claims. (Cl. 260—397.1)

The present invention relates to a novel process for the preparation of certain trihydroxy steroid adducts, and to the novel products produced by the said novel process. This application is a continuation-in-part of our prior filed application Serial 187,364, filed September 28, 1950, now Patent No. 2,582,263.

The novel compounds of the present invention are the 3,9,11-trihydroxy-5,7-pregnadien-20-one maleic acid adduct and di-alkali metal salts thereof, having the following structural formula:

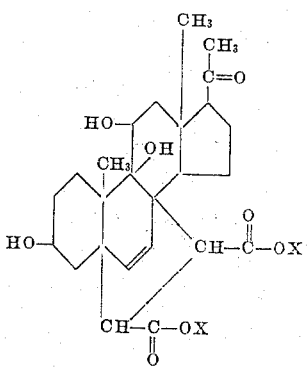

wherein X is hydrogen or an alkali metal, e. g., sodium or potassium. The alkali metal salts are obtained by careful saponification of a starting 3,9,11-triacyloxy adduct with a suitable alkali metal base, e. g., sodium or potassium hydroxide, in an organic solvent, e. g., dioxane, methanol, ethanol, or the like. A one normal solution of the base has been found satisfactory when the anhydride adduct is employed, and the same or similar concentrations are also suitable when a maleic acid or maleic acid diester adduct is used as starting material for the saponification. About five molar equivalents of the base are usually employed for optimum yields, although somewhat more or less may be employed if desired. The free acid is usually obtained directly from the 3,9,11-triacyloxy adduct, after saponification to the trihydroxy maleic acid salt, but without separation thereof, by neutralization using an aqueous mineral acid, e. g., hydrochloric acid, sulfuric acid, or the like.

The starting compounds for the process of the invention are 3,9,11-triacyloxy-5,7-pregnadien-20-one adducts, which may be represented by the following formula:

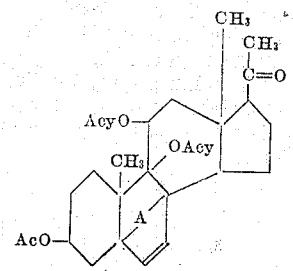

wherein Ac is an acyl group which is the residue of an organic monocarboxylic organic acid, especially such acids containing from one to eight carbon atoms, inclusive; wherein Acy is an acyloxy group which is the residue of a lower-aliphatic acid containing up to and including eight carbon atoms; and wherein A is the adduct radical of a dienophile selected from the group consisting of maleic acid, maleic anhydride, and lower-alkyl diesters of maleic acid, especially lower-alkyl diesters containing from one to eight carbon atoms, inclusive, in the esterifying groups.

It is an object of the present invention to provide a novel group of compounds which are useful in the preparation of physiologically active steroid compounds containing an oxygen atom at carbon atom eleven. Another object of the invention is the provision of a process for the production of the novel compounds, adducts of 3,9,11-trihydroxy-5,7-pregnadien-20-ones. Other objects of the invention will become apparent hereinafter.

The compounds of the present invention, as previously stated, are useful in the preparation of steroid compounds having an oxygen atom attached to carbon atom eleven. Such compounds are of particular interest in the field of steroid research due to the biological activity of the cortical hormones and certain known derivatives thereof, which oxygenated steroids are known to have biological effects differing markedly from the unoxygenated steroids. It is, therefore, of importance to investigate the oxygenated derivatives of such adducts, as well as their transformation products. The importance of such investigation is moreover emphasized by the acute shortage of adrenal cortical hormones, and the absence of any present suggestion for alleviation of the said shortage except through organic synthesis.

Novel starting compounds for use in the process of the invention, which are of particular interest, are those 3,9,11-triacyloxy-5,7-pregnadien-20-one adducts of the above generic formula wherein the adduct bridge (–A–) is represented by the graphic formula:

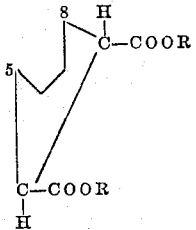

wherein R represents hydrogen or the organic residue of an alcohol. Such esters include the methyl, ethyl, propyl, isopropyl, butyl, isobutyl, lauryl, heptyl, octyl, cyclopentyl, cyclohexyl, benzyl, and like esters. The esterifying radical may also contain non-reactive substituents, such as halo, methoxy, or hydroxy, if desired, as in the case of chloroacetic, ethoxyacetic, or hydroxyacetic acid esters. While the esters of the maleic acid adduct are described herein with particular reference to the methyl esters, the preferred embodiment of R is a lower-alkyl radical containing from one to eight carbon atoms, inclusive. Alternatively, the adduct may be depicted by the graphic formula:

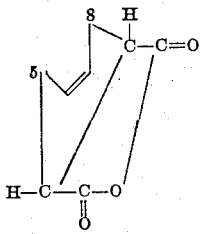

which is representative of the maleic anhydride adduct, and for the process of the present invention, employment of a maleic anhydride adduct is preferred.

The compounds of the present invention are usually colorless crystalline solids. They are readily convertible to 3,11-diacyloxy-9-hydroxy-5,7-pregnadien-20-one maleic acid adduct 9-hydroxy lactones, 3,9,11-trihydroxy-5,7-pregnadien-20-one maleic acid adduct 9-hydroxy lactone, and 9-hydroxy-5,7-pregnadien-3,11,20-trione maleic acid adduct 9-hydroxy lactone.

The starting 3,9,11-triacyloxy-5,7-pregnadien-20-one adducts are prepared from a selected 3-hydroxy- or 3-acyloxy-9,11-oxido-5,7-pregnadien-20-one maleic anhydride, maleic acid, or dialkyl maleate adduct of the formula:

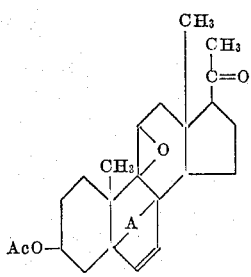

wherein Ac is hydrogen or an acyl group which is the residue of an organic monocarboxylic acid such as those indicated previously within the value of Ac, and wherein A has the value given previously. The selected 9,11-oxido adduct is reacted with an excess of acetic anhydride in the presence of a catalytic amount of stannic chloride at a temperature between about minus fifty and plus fifty degrees centigrade, preferably between about minus ten and plus ten degrees centigrade. Instead of the acetic anhydride, other lower aliphatic acid anhydrides which are liquid at the said temperatures, e. g., propionic, butyric, valeric or hexanoic anhydrides, may be employed, to give, of course, instead of the acetoxy derivative, the acyloxy derivative corresponding to the anhydride employed. Alternatively, other lower aliphatic acid anhydrides may be employed, e. g., heptanoic or octanoic anhydrides, using an inert organic solvent as reaction medium for those higher anhydrides which may be solid at the reaction temperatures employed. If a 3-hydroxy 9,11-oxido adduct is reacted with the anhydride in the presence of stannic chloride, the 3-hydroxy group will be acylated and likewise, if a 9,11-oxido maleic acid adduct is reacted with the anhydride, some transformation to the maleic anhydride adduct may occur. After a suitable reaction period, e. g., 45 minutes, the reaction product may be poured into ice and water and the mixture stirred until all of the acetic anhydride has hydrolyzed, during which time the product precipitates and may be filtered off.

The 3-substituted-9,11-oxido-5,7-pregnadien-20-one adducts have the formula given previously, and are prepared by epoxidation of the 9,11-double bond of 3-substituted-5,7,9(11)-pregnatrien-20-one adducts, of the formula:

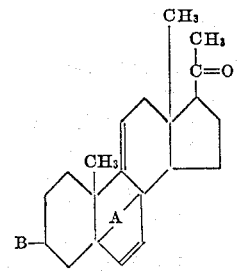

wherein B is selected from the group consisting of hydroxy and an acyloxy group derived from an organic carboxylic acid containing from one to eight carbon atoms, inclusive, and A has the value previously assigned. In such compounds, B represents either hydroxy or an ester of the 3-hydroxy group with a carboxylic acid containing up to and including eight carbon atoms. Among the acids which can be used are formic, acetic, propionic, butyric, valeric, hexanoic, heptanoic, octanoic, succinic, glutaric, cyclopentanoic, benzoic, toluic, and the like. Preferred acids are the lower-aliphatic acids. The acids may also contain substituents, such as halo, alkyl, and methoxy, which are non-reactive under the reaction conditions employed. The 3-hydroxy compounds are prepared from the 3-acyloxy compounds by saponification, which procedure is productive of the 3-hydroxy ketone diacid, which can then be converted to the anhydride or diester if desired, as more fully described hereinafter.

The 3-substituted 5,7,9(11)-pregnatrien-20-one adducts are conveniently prepared by the selective oxidation of an enol ester of an adduct of 3-acyloxybisnor-5,7,9(11)-cholatrien-22-al, represented by the formula:

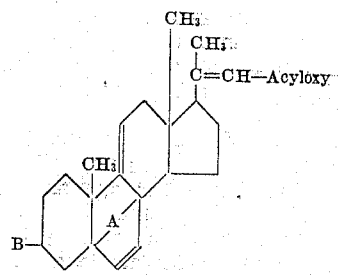

wherein A and B have the values previously given, B in this case excluding the free hydroxy group.

Adducts of 3,22-diacyloxybisnor-5,7,9(11),20-(22)-cholatetraenes [22-enol esters of 3-acyloxybisnor-5,7,9(11)-cholatrien-22-als] are conveniently prepared by subjecting an adduct of a 3-acyloxybisnor-5,7,9(11)-cholatrien-22-al, of the formula:

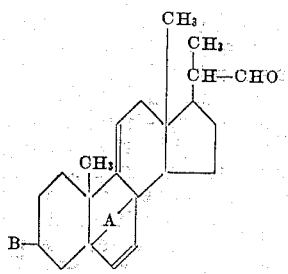

wherein A and B have the values previously given, to the action of an acid anhydride or an acid halide in the presence of an alkaline salt of the acid. The starting adducts of 3-acyloxybisnor-5,7,9(11)-cholatrien-22-als can be prepared from adducts of 3-esters of dehydroergosterol by selective oxidation as described and claimed in the copending application Serial 111,100 of Robert H. Levin, filed August 18, 1949, and as more fully described hereinafter.

The 3-esters of dehydroergosterol, from which the 3-acyloxybisnor-5,7,9(11)-cholatrien-22-al adducts are prepared, can be synthesized in several ways starting with ergosterol. For example, ergosterol can be transformed to dehydroergosterol with mercuric acetate according to known methods [Windaus et al., Ann. 465, 157 (1928)] and the 3-hydroxy group of the dehydroergosterol acylated by known procedure. Alternatively the 3-hydroxy group of ergosterol can be acylated prior to the preparation of the dehydro derivative; a procedure which is particularly preferred in the preparation of the 3-acetoxy derivative. The adducts of dehydroergosterol are then prepared by the addition of maleic anhydride or the like to dehydroergosterol or a 3-ester thereof according to known methods [Honigmann, Ann. 508, 89 (1934)]. The anhydrides can then be converted to their corresponding acids and esters if desired.

The ester group, when present in the 3-position of dehydroergosterol, is for the purpose of protecting the 3-hydroxy group in subsequent chemical reactions. For this purpose any convenient ester of an organic carboxylic acid, which is non-reactive under the conditions of the reaction, is suitable. The preferred acids are the fatty acids such as formic, acetic, propionic, butyric, valeric, hexanoic, heptanoic, octanoic; dibasic acids such as malonic, succinic, phthalic; cycloaliphatic acids such as cyclopentanoic and cyclohexanoic; and aromatic acids such as benzoic, toluic, and the like. The acids may also contain substituents such as halogen, alkyl, the methoxy radical, and the like, and these substituents will be carried throughout the synthesis. If desired, the acyl group can be changed to another acyl group by saponifying the ester to give a 3-hydroxy compound, which can then be re-esterified as previously described.

A preferred method for preparing some of the dehydroergosteryl adducts comprises the saponification of a 3-acyloxy-adduct of dehydroergosterol with dilute alkali followed by acidification. The 3-hydroxy dicarboxylic acid thus formed can be converted to the 3-hydroxy anhydride by heat, or it can be converted to any desired 3-acyloxy anhydride adduct by heating under reflux with the appropriate acid anhydride or chloride in pyridine solution. Dialkyl esters of the previously mentioned dicarboxylic acid adducts can be prepared by subjecting the acid to the action of an esterification reagent such as a diazoalkane [Wilds et al., J. Org. Chem. 13, 763 (1948)], e. g., diazomethane, diazoethane, diazobutane, and the like.

The selective oxidation of an adduct of dehydroergosterol, or a 3-ester thereof, to produce an adduct of 3-hydroxybisnor-5,7,9(11)-cholatrien-22-al, or a 3-ester thereof, is accomplished by dissolving the dehydroergosteryl adduct in a suitable solvent, cooling to about minus 80 to plus 30 degrees centigrade, and passing ozone into the solution until about 1.0 to 1.25 moles of ozone per mole of adduct have been absorbed. The temperature of the solution should be maintained below plus 30 degrees centigrade, preferably between a temperature of minus 30 and minus 70 degrees centigrade, during the addition of ozone, although temperatures as low as minus 80 and as high as plus 30 degrees centigrade are operative. The lower temperatures of the preferred range are readily obtained by cooling the solution of the adduct with a bath of solid carbon dioxide in acetone or the like, although various other methods of cooling can be used. Many of the customary solvents used in ozonizations such as chloroform, acetic acid, carbon tetrachloride, ethylene chloride, methylene chloride, and the like, can be used.

The ozonides are then decomposed under reducing conditions, that is, in the absence of oxidizing agents, whether added or formed in the course of the reaction by products of decomposition of the ozonide. This means that excess oxygen formed by decomposition of the ozonide is prevented from forming hydrogen peroxide by combining with any moisture present, and that molecular oxygen is prevented from oxidizing the aldehyde thus formed. This can be conveniently accomplished by decomposing the ozonide in glacial acetic acid by the addition of finely-powdered zinc.

As is conventional with ozonizations when conducted in solvents, other than glacial acetic acid, the solvent used for ozonization is replaced, after completion of the ozonization, by adding glacial acetic acid and removing the lower-boiling solvent by fractional distillation. Alternatively, the solvent can be removed by careful warming under reduced pressure prior to the addition of glacial acetic acid, if desired.

After decomposition of the ozonide and removal of the zinc, the aldehyde can be recovered by diluting the acetic acid with water, or in other conventional manner, such as by formation of an aldehyde derivative, e. g., the dinitrophenylhydrazone.

Adducts of 3 - substituted 22 - acyloxybisnor - 5,7,9(11),20(22)-cholatetraenes [22-enol-esters of adducts of 3-acyloxybisnor-5,7,9(11)-cholatrien-22-als] can be conveniently prepared by heating the corresponding 3-hydroxy or acyloxy aldehyde maleic acid, maleic acid anhydride, or maleic acid ester adduct with a large excess of an organic carboxylic acid anhydride in the presence of a small amount of an alkali metal salt of the acid corresponding to the anhydride employed or an acid catalyst such as para-toluene sulfonic or sulfuric acid. The preferred anhydride is acetic anhydride, but other anhydrides, such as propionic, butyric, valeric, hexanoic and octanoic anhydrides, as well as benzoic acid anhydride, ortho-toluic acid anhydride, and the like, are also operative. The acid anhydrides can also be substituted by non-reactive groups, such as halo, alkyl, and methoxy, as in the case of chloroacetic, ortho-toluic, or methoxybenzoic acid anhydrides. The reaction can be conveniently followed by observing the color changes in the reaction mixture, optimum yields being obtained by discontinuing the application of heat when the color of the solution changes from yellow to brown. Ordinarily the reaction is heated at about 140 degrees centigrade for from about four to six hours, but temperatures as low as 100 and as high as 180 degrees centigrade are also operative. The reaction is usually conducted at the boiling point of the anhydride, but in the case of the higher-boiling anhydrides, such as benzoic anhydride, a suitable temperature control, such as 100–150 degrees centigrade, must be used, since the adduct otherwise tends to decompose in the higher temperature range. If a 3-hydroxy aldehyde adduct is thus reacted with an anhydride, the hydroxy group will be acylated, and, similarly, if a maleic acid adduct is used instead of a diester or an anhydride, the anhydride will be formed. The enol ester can be isolated by removing the excess anhydride under reduced pressure, and separating the enol ester from alkali metal salts, which procedure yields a product sufficiently pure for most purposes, but which can be further purified by recrystallization from acetone-water, acetone-pentane, or like pairs of solvents, if desired.

The ozonization of the thus-prepared enol acylate to produce 3-acyloxy-5,7,9(11)-pregnatrien-20-one adducts involves dissolving the enol ester in a suitable solvent, cooling to about minus eighty degrees centigrade to plus thirty degrees centigrade, and passing ozone, ozonized air, or ozonized oxygen into the solution until about 1.0 to about 1.25 moles, preferably 1.0 to 1.1 moles, of ozone per mole of adduct have been absorbed. The addition of ozone to the 20:22 double bond is so rapid that only a small amount of ozone escapes from the reaction mixture, and the amount of ozone ordinarily required therefore closely approximates the theoretical amount. Loss to the solvent, if any loss occurs, must be taken into consideration in calculating the amount of ozone to be introduced. The temperature of the solution should be maintained below plus thirty degrees centigrade, preferably between a temperature of minus thirty and minus seventy degrees centigrade, during the addition of ozone, although temperatures as low as minus eighty and as high as plus thirty degrees centigrade are operative. The lower temperatures of the range are readily obtained by cooling the solution of the adduct with a bath of solid carbon dioxide in acetone or the like, although various other methods of cooling may be employed. Many of the customary solvents used in ozonizations, such as chloroform, methylene chloride, ethylene chloride, carbon tetrachloride, acetic acid, and the like, can be used for the ozonization reaction.

The 20:22 ozonides thus produced are then decomposed under conditions normally employed for decomposition of such compounds. This can be accomplished conveniently by decomposing the ozonide with hydrogen peroxide, by hydrolysis, with zinc in glacial acetic acid, or by a catalytic amount of colloidal metal such as silver, platinum, or palladium in a solvent, such as glacial acetic acid, alcohol, or ethyl acetate, in which latter case reductive conditions, e. g., a hydrogen atmosphere, are also employed. The use of "reductive conditions" is well established in the art [Hill and Kelly, "Organic Chemistry," page 53, The Blackiston Company, Philadelphia (1934); Church et al., J. Am. Chem. Soc. 56, 176–184 (1934); Gilman "Organic Chemistry," second edition, page 636, John Wiley and Sons, New York (1943); Long, Chem. Reviews 27, 452–454 (1940)].

As is conventional with decomposition of ozonides with zinc, when the ozonizations are conducted in solvents other than glacial acetic acid, the solvent used for the ozonization is replaced, after completion of the ozonization, by adding glacial acetic acid and removing the lower-boiling solvent by fractional distillation, or the solvent can be removed by careful warming under reduced pressure prior to the addition of acetic acid, if desired. After decomposition of the 20:22 ozonide and removal of the metal, the ketone can be recovered by diluting the acetic acid with water, or by other conventional procedure for the recovery of ketones, such as by formation of a carbonyl derivative, e. g., the 2,4-dinitrophenylhydrazone. Recrystallization from acetone or the like results in a more highly purified ketone product. The 3-hydroxy ketones are prepared by saponification of the 3-acyloxy group to give the 3-hydroxy ketone diacid, which can then be converted to the anhydride or a diester, if desired, by heating in a vacuum or by reaction with a diazo-alkane respectively.

The preparation of the 3-hydroxy- or 3-acyloxy-9,11-oxido-5,7-pregnadien-20-one adducts involves the oxidation of the corresponding 3-hydroxy- or 3-acyloxy-5,7,9(11)-pregnatrien-20-one adduct using an organic peracid or concentrated hydrogen peroxide as the oxidant. Hydrogen peroxide is usually employed in the form of a twenty to ninety percent by weight aqueous solution, a thirty percent solution being preferred. The reaction is carried out by stirring the adduct and oxidant together, preferably in an organic medium which is non-reactive under the reaction conditions. Suitable media include chloroform, carbon tetrachloride, mixtures of ether and chloroform, glacial acetic acid, and many others. The ratio of oxygen-furnishing agent to steroid can be varied considerably within broad ranges. Ratios of up to twenty moles to one are operative, but ratios of from one to four moles per mole of steroid are preferred for attainment of optimum yields, the exact ratio being preferably varied inversely with the reaction time desired to be employed. The temperature of the mixture is usually maintained at from about zero degrees to about 100 degrees centigrade for a suitable period, e. g., from about one-half to twenty-four hours, depending on the concentration of oxygen-furnishing agent, and the 9,11-oxido compound then isolated in any convenient manner, such as by volatilizing the reaction medium, extracting the residue with chloroform, filtering, volatilizing the chloroform, and recrystallizing the residue, e. g., from eighty percent aqueous acetone. Alternatively, the compounds may be recovered by pouring the reaction product into water, filtering the solution, and drying the precipitate. The 9,11-oxido compound is usually obtained in a state of high purity after one or two recrystallizations. A convenient reaction medium when the oxidant is hydrogen peroxide is glacial acetic acid, and, when such is employed, the 9,11-oxido compound is separated readily by pouring the reaction product onto cracked ice to precipitate the 9,11-oxido compound, filtering, and recrystallizing the dried crude product, e. g., from ethyl acetate. The 3-acyloxy 9,11-oxido compounds, when such are prepared from corresponding 3-acyloxy-5,7,9(11)-pregnatrien-20-ones, are readily convertible to the 3-hydroxy compounds by saponification with a base, which procedure is productive of the 3-hydroxy diacid, which can then be converted to the 3-hydroxy anhydride by heat in a vacuum, or to the 3-hydroxy diester by treatment with diazomethane, diazoethane, or the like.

The following examples are illustrative of the process and products of the present invention, but are not to be construed as limiting.

PREPARATION 1.—DIMETHYL MALEATE ADDUCT OF DEHYDROERGOSTERYL BENZOATE

To a solution of 21 grams of dimethyl maleate adduct of dehydroergosterol in 69 milliliters of warm pyridine was added 9.5 milliliters of benzoyl chloride. After standing at room temperature for fifteen minutes, the mixture was poured into 1400 milliliters of ice-water and the solid removed by filtration, dried, and recrystallized from acetone. There was thus obtained 26.4 grams of dimethyl maleate adduct of dehydroergosteryl benzoate, melting at 203 to 205.5 degrees centigrade.

PREPARATION 2.—DIMETHYL MALEATE ADDUCT OF DEHYDROERGOSTERYL ACETATE

In a manner essentially that described in Preparation 1, the dimethyl maleate adduct of dehydroergosteryl acetate, melting at 177 to 179 degrees centigrade, was prepared from the dimethyl maleate adduct of dehydroergosterol and acetyl chloride.

PREPARATION 3.—DIMETHYL MALEATE ADDUCT OF DEHYDROERGOSTERYL FORMATE

A solution of six grams of dimethyl maleate adduct of dehydroergosterol in fifty milliliters of 87 percent formic acid was heated under reflux for one hour, cooled, and the dimethyl maleate adduct of dehydroergosteryl formate filtered therefrom. Upon crystallization from acetone, the purified material melted at 177.5 to 178.5 degrees centigrade.

PREPARATION 4.—MALEIC ACID ADDUCT OF DEHYDROERGOSTEROL

A solution of 2.0 grams of sodium hydroxide in twenty milliliters of water was added to a solution of 1.73 grams of the maleic anhydride adduct of dehydroergosteryl acetate (M. P. 230–232 degrees centigrade) in forty milliliters of dioxane. The mixture solidified, but dissolved on addition of 300 milliliters of water and heating to eighty degrees centigrade. After half an hour the solution was cooled and made acid with aqueous three normal hydrochloric acid, to give 1.61 grams of precipitate. On crystallization from a dioxane-water mixture, the maleic acid adduct of dehydroergosterol melted at 190–192 degrees centigrade.

PREPARATION 5.—MALEIC ANHYDRIDE ADDUCT OF 3-HEPTANOYLOXY-DEHYDROERGOSTEROL

The maleic acid adduct of dehydroergosterol from Preparation 4 was dissolved in a mixture of seven milliliters of warm pyridine and fourteen milliliters of heptylic anhydride, and the mixture heated under reflux for one hour. About eighty percent of the reaction solvent was removed under reduced pressure, and the residue then dissolved in methyl alcohol. The methyl alcohol solution was concentrated and cooled to yield 4.8 grams of the maleic anhydride adduct of 3-heptanoyloxydehydroergosterol, melting at 186–191.5 degrees centigrade.

PREPARATION 6.—MALEIC ANHYDRIDE ADDUCT OF 3-BETA-ACETOXY-BISNOR-5,7,9(11)-CHOLATRIEN-22-AL

A solution of 5.35 grams of the maleic anhydride adduct of 3-beta-acetoxydehydroergosterol in 107 milliliters of methylene chloride was cooled to about minus seventy degrees centigrade and ozonized until 505 milligrams of ozone had been absorbed. The temperature of the solution was then gradually raised to about plus ten to fifteen degrees centigrade, whereupon seventy milliliters of glacial acetic acid was added and the methylene chloride removed under reduced pressure. Seven grams of zinc dust was then added to the cold solution at a uniform rate over a period of ten minutes, while keeping the reaction temperature below plus twenty degrees centigrade. After being stirred for fifteen minutes, the mixture was filtered and the filtrate poured into water. There was obtained 4.31 grams of maleic anhydride adduct of 3-beta-acetoxybisnor-5,7,9(11)-cholatrien-22-al, a fine white powder which melted at 187–197 degrees centigrade.

To a solution of 0.30 gram of the maleic anhydride adduct of 3-beta-acetoxybisnor-5,7,9(11)-cholatrien-22-al, in thirty milliliters of ethanol, was added twenty milliliters of alcohol containing one percent 2,4-dinitrophenylhydrazine and three percent concentrated hydrochloric acid. The mixture was allowed to stand for one hour at room temperature and then placed in a refrigerator to complete precipitation of the yellow crystals. The precipitate was then collected and recrystallized from a mixture of chloroform and alcohol, to give the 2,4-dinitrophenylhydrazone of the maleic anhydride adduct of 3-beta-acetoxybisnor-5,7,9(11)-cholatrien-22-al, melting at 269–271 degrees centigrade.

PREPARATION 7.—MALEIC ANHYDRIDE ADDUCT OF 3-BETA-ACETOXY-BISNOR-5,7,9(11)-CHOLATRIEN-22-AL

A two-liter, round-bottom flask was charged with fifty grams (0.93 mole) of dehydroergosteryl acetate maleic anhydride adduct and one liter of methylene chloride. The solution was cooled to Dry-Ice temperature with a trichloroethylene bath and ozonized oxygen passed through at a rate of 1200 milliliters of oxygen per minute (at this rate the ozonizer was producing about 36 milligrams of ozone per minute). The flow of ozonized oxygen was maintained for 128 minutes, a total of 4608 milligrams (105 percent) of ozone being passed into the solution. The reaction mixture was transferred to a two-liter, round-bottom flask fitted with a capillary and a condenser for downward distillation, 300 milliliters of acetic acid added, and the methylene chloride distilled over in vacuo at forty degrees centigrade or below. The flask was then placed in a water bath and fitted with a stirrer. An additional 200 milliliters of acetic acid was added and the ozonide decomposed by the addition of fifty grams of zinc dust. The zinc dust was added in portions over a period of twenty to thirty minutes while the solution was stirred and the temperature maintained at seventeen to twenty degrees centigrade. After addition, the mixture was stirred for another twenty minutes and then filtered. The precipitated zinc dust was washed by filtering 100 milliliters of acetic acid therethrough, and the filtrate gradually diluted with water (1100 to 1200 milliliters) until the product had been drowned out. The product was then cooled in the refrigerator overnight and filtered. The yield of crystalline product was 42 grams, assaying 89-95 percent of the desired aldehyde.

PREPARATION 8

In a manner essentially that described in Preparation 6, the following compounds were prepared.

(1) Maleic anhydride adduct of 3-beta-formoxybisnor-5,7,9(11)-cholatrien-22-al, melting at 95-130 degrees centigrade. 2,4-dinitrophenylhydrazone, melting at 165-168 degrees centigrade.

(2) Maleic anhydride adduct of 3-beta-heptanoyloxybisnor-5,7,9(11)-cholatrien-22-al, melting at 197.5-199 degrees centigrade. 2,4-dinitrophenyl hydrazone, melting at 253-257 degrees centigrade.

(3) Dimethyl maleate adduct of 3-beta-benzoyloxybisnor-5,7,9(11)-cholatrien-22-al, melting at 183-187 degrees centigrade. 2,4-dinitrophenylhydrazone, melting at 224-249 degrees centigrade.

(4) Dimethyl maleate adduct of 3-beta-acetoxybisnor-5,7,9(11)-cholatrien-22-al, melting at 172-178 degrees centigrade. 2,4-dinitrophenylhydrazone, melting at 238 to 244 degrees centigrade.

(5) Dimethyl maleate adduct of 3-hydroxybisnor-5,7,9(11)-cholatrien-22-al, melting at 163-170 degrees centigrade. 2,4-dinitrophenylhydrazone, melting at 250-254 degrees centigrade.

In a manner similar to the above, the maleic anhydride adduct of 3-hydroxybisnor-5,7,9(11)-cholatrien-22-al is obtained from dehydroergosteryl maleic anhydride adduct; the maleic acid adduct of 3-hydroxybisnor-5,7,9(11)-cholatrien-22-al is obtained from dehydroergosteryl maleic acid adduct; and 3-acyloxybisnor-5,7,9(11)-cholatrien-22-al maleic acid adducts are obtained from the maleic acid adduct of 3-acyloxy-dehydroergosterols.

PREPARATION 9.—DIMETHYL MALEATE ADDUCT OF 3-HYDROXYBISNOR-5,7,9(11)-CHOLATRIEN-22-AL

A solution of 2.69 grams (.005 mole) of the dimethyl ester of the maleic acid adduct of dehydroergosterol, in eighty milliliters of methylene chloride, cooled by a Dry-Ice and trichloroethylene bath, was treated with ozonized oxygen until 247.36 milligrams (.0051 mole) of ozone was absorbed. The solution was then allowed to warm to room temperature, whereafter thirty milliliters of acetic acid was added and the methylene chloride removed in vacuo. While cooling in a water-bath at fifteen degrees centigrade, four grams of zinc dust was added in portions with stirring, the temperature being maintained between fifteen and twenty degrees centigrade. Stirring was continued for another fifteen minutes, whereafter the zinc was separated by filtration. The filtrate was diluted with water to cloudiness, extracted with ether, the ether extract washed with sodium bicarbonate and then with water to neutrality, the solution then dried over sodium sulfate and evaporated to dryness in vacuo. The residue was crystallized from acetic acid and water, giving 1.92 grams (81.5 percent of the theoretical), melting point 91-97 degrees centigrade, which yielded a dinitrophenylhydrazone derivative in 72.5 percent yield, melting point 212-238 degrees centigrade. The aldehyde was recrystallized and found to have a purified melting point of 163-170 degrees centigrade, while the dinitrophenylhydrazone derivative was recrystallized until a melting point of 250-254 degrees centigrade was attained.

PREPARATION 10.—MALEIC ANHYDRIDE ADDUCT OF 3-BETA-ACETOXY- 22 -ACETOXYBISNOR - 5,7,9(11)-CHOLATETRAENE

A mixture of twenty grams of the maleic anhydride adduct of 3-beta-acetoxybisnor-5,7,9-(11)-cholatrien-22-al, six grams of anhydrous sodium acetate, and 600 milliliters of acetic anhydride, was heated under reflux for six hours, whereafter volatile components were removed under reduced pressure. The resulting solid was digested with five fifty-milliliter portions of boiling acetone for five minutes each, and the extracts combined and diluted with 130 milliliters of water. There was thus obtained sixteen grams of the maleic anhydride adduct of 3-beta-acetoxy-22-acetoxybisnor - 5,7,9(11),20(22)-cholatetraene, which melted at 186 to 193 degrees centigrade. Recrystallization of the crude product from a mixture of acetone and pentane raised the melting point to 200.5 to 202 degrees centigrade.

PREPARATION 11.

In a manner essentially that described in Preparation 10, the following compounds were prepared:

(1) The dimethyl maleate adduct of 3-beta-benzoyloxy - 22 - acetoxybisnor-5,7,9(11),20(22)-cholatetraene, which melted at 210 to 211 degrees centigrade.

(2) The dimethyl maleate adduct of 3-beta-acetoxy-22-acetoxybisnor - 5,7,9(11),20(22)-cholatetraene, which melted at 181 to 183 degrees centigrade.

In the same manner as given above, 22-acyloxy, e. g., formoxy, acetoxy, propionoxy, butyroxy, valeroxy, hexanoyloxy, heptanoyloxy, octanoyloxy, benzoyloxy, and the like 3-acyloxybisnor - 5,7,9(11),20(22) - cholatetraene adducts are obtained from the compounds of Preparations 6, 7, and 8. Such representative compounds include 3 - formoxy - 22 - acetoxybisnor-5,7,9(11),20(22)-cholatetraene, 3-propionoxy-22-acetoxybisnor-5,7,9(11),20(22)-cholatetraene, 3,-22 - dipropionoxybisnor - 5,7,9(11),20(22)-cholatetraene, 3,22 - dibenzoyloxybisnor - 5,7,9(11),20-(22)-cholatetraene, and 3-heptanoyloxy-22-octanoyloxybisnor -5,7,9(11),20(22) - cholatetraene adducts with maleic anhydride or maleic acid esters such as the dimethyl maleate, diethyl maleate, dipropyl maleate, diisopropyl maleate, dibutyl maleate, dioctyl maleate, dibenzyl maleate, and the like.

PREPARATION 12.—MALEIC ANHYDRIDE ADDUCT OF 3-BETA-ACETOXY-5,7,9(11)-PREGNATRIEN-20-ONE

A solution of 5.08 grams of the maleic anhydride adduct of 3-beta-acetoxybisnor-5,7,9(11)-cholatrien-22-al enol acetate in 100 milliliters of methylene chloride was cooled to about minus seventy degrees centigrade and ozonized until 483 milligrams of ozone had been absorbed. Fifty milliliters of glacial acetic acid was then added and the methylene chloride removed under reduced pressure. An additional thirty milliliters of glacial acetic acid was then added and the ozonide decomposed by adding seven grams of powdered zinc at a substantially uniform rate while maintaining the reaction temperature between seventeen and twenty degrees centigrade. The mixture was stirred for an additional twenty minutes, filtered, and the zinc washed with 140 milliliters of glacial acetic acid. The organic extracts were combined and diluted with seventy milliliters of water. When crystallization commenced, the rate of precipitation was increased by addition of two volumes of water. There was thus obtained 4.0 grams of the maleic anhydride adduct of 3-beta-acetoxy-5,7,9(11)-pregnatrien-20-one, which melted at 240 to 264.5 degrees centigrade. Several recrystallizations of the crude material from acetone raised the melting point to 263.5 to 264.5 degrees centigrade.

PREPARATION 13.—MALEIC ACID ADDUCT OF 3-BETA-HYDROXY-5,7,9(11)-PREGNATRIEN-20-ONE

A solution of 4.52 grams (0.01 mole) of the maleic anhydride adduct of 3-beta-acetoxy-5,7,9-(11)-pregnatrien-20-one, M. P. 263-264.5 degrees centigrade, in a mixture of 100 milliliters of 1,4,-dioxane and 400 milliliters of water containing four grams (0.1 mole) of sodium hydroxide was allowed to stand at room temperature for two and one-half hours, whereupon a small quantity of plate-like crystals formed. These were dissolved by heating the mixture to seventy degrees centigrade for one-half hour. The reaction mixture was then made acid with fifty milliliters of three normal hydrochloric acid and refrigerated to give a precipitate of 3.05 grams of needle-like crystals melting at 173-177 degrees centigrade. On crystallization from a dioxane-water mixture, the compound melted at 211-215 degrees centigrade. The melting point was found to vary somewhat with the rate of heating.

Analysis:
Calculated for $C_{25}H_{32}O_6$: C, 70.07; H, 7.53
Found: C, 69.80; H, 7.47

PREPARATION 14.—DIMETHYL MALEATE OF 3-BETA-HYDROXY-5,7,9(11)-PREGNATRIEN-20-ONE

A suspension of 0.4 gram of the maleic acid adduct of 3-beta-hydroxy-5,7,9(11)-pregnatrien-20-one, in fifty milliliters of dry ether, was cooled in an ice-salt bath while a slight excess of diazomethane in methylene chloride was added over a 25-minute period with stirring. Ten minutes after addition was complete, the solution was placed on a steam bath and concentrated rapidly to dryness. The residue was crystallized from an acetone-water mixture to give 0.34 gram of the dimethyl maleate of 3-beta-hydroxy-5,7,9(11)-pregnatrien-20-one, melting at 193-195 degrees centigrade. After chromatography and recrystallization, the compound melted at 192-197 degrees centigrade.

In the same manner as given above, other dialkyl maleates, e. g., the diethyl, dipropyl, diisopropyl, dibutyl, and dioctyl maleates, of 3-hydroxy-5,7,9(11)-pregnatrien-20-one are prepared from 3-hydroxy-5,7,9(11)-pregnatrien-20-one maleic acid adduct and the appropriate diazoalkane, or by other equivalent esterification procedure.

PREPARATION 15.—MALEIC ANHYDRIDE ADDUCT OF 3-BETA-HEPTANOYLOXY-5,7,9(11)-PREGNATRIEN-20-ONE

The maleic anhydride adduct of 3-beta-heptanoyloxy-5,7,9(11)-pregnatrien-20-one, melting point 170-171 degrees centigrade, was prepared by refluxing the maleic acid adduct of 3-beta-hydroxy-5,7,9(11)-pregnatrien-20-one with heptylic anhydride and pyridine for a period of twenty hours, and working up the reaction product in the usual manner.

PREPARATION 16.—MALEIC ANHYDRIDE ADDUCT OF 3-BETA-HYDROXY-5,7,9(11)-PREGNATRIEN-20-ONE

Similarly, the maleic anhydride adduct of 3-beta-hydroxy-5,7,9(11)-pregnatrien-20-one, melting point about 195 degrees centigrade, was prepared by refluxing the maleic acid adduct of 3-beta-hydroxy-5,7,9(11)-pregnatrien-20-one with Dowtherm for eight hours. The 3-hydroxy-maleic anhydride adduct is also obtained by heating the 3-hydroxy maleic acid adduct to just above its melting point, which procedure causes water to be evolved with closing of the anhydride ring.

PREPARATION 17.—DIMETHYL MALEATE OF 3-BETA-ACETOXY-5,7,9(11)-PREGNATRIEN-20-ONE

A solution of 0.15 gram of the dimethyl maleate adduct of 3-beta-hydroxy-5,7,9(11)-pregnatrien-20-one, in 2.5 milliliters of acetic anhydride and 2.5 milliliters of pyridine, was heated on the steam bath for ninety minutes, cooled to room temperature, and poured into ice-water. The resulting precipitate was collected by filtration and found to melt at 205-209 degrees centigrade. Recrystallization from methanol gave the dimethyl maleate of 3-beta-acetoxy-5,7,9(11)-pregnatrien-20-one, melting at 207-211 degrees centigrade.

Analysis:
Calculated for $C_{29}H_{38}O_7$: % C, 69.86; % H, 7.68
Found: % C, 69.81; % H, 7.86
69.70 7.62

By the same manner of esterification, the following C-3 esters were prepared: (1) dimethyl maleate adduct of 3-beta-formoxy-5,7,9(11)-pregnatrien-20-one, melting point 223-230 degrees centigrade, and (2) the dimethyl maleate adduct of 3-beta-benzoyloxy-5,7,9(11)-pregnatrien-20-one, melting point 250-254 degrees centigrade.

PREPARATION 18.—DIMETHYL MALEATE OF 3-BETA-ACETOXY-5,7,9(11)-PREGNATRIEN-20-ONE

A suspension of fifteen grams of 3-beta-acetoxy-5,7,9(11)-pregnatrien-20-one maleic anhydride adduct in 320 milliliters of methanol was cooled in an ice-salt bath. A boiling chip was added and the suspension treated with approximately 775 milliliters of diazomethane-methylene chloride solution in 100-milliliter portions over a period of three hours, all of the solid going into solution. At the end of this time the solution was reduced to one-half its original volume on the steam bath to remove excess diazomethane, filtered, and concentrated to about 250 milliliters. Upon cooling, crystals of the dimethyl maleate of 3-beta-acetoxy-5,7,9(11)-pregnatrien-20-one, melting at 204–208 degrees centigrade, were deposited. The yield was 13.2 grams (87 percent of theory).

In the same manner as given above, still other 5,7,9(11)-pregnatrien-20-one adducts are prepared from the corresponding 3,22-diacyloxybisnor-5,7,9(11),20(22)-cholatetraene maleic acid, maleic acid anhydride, and maleic acid diester adducts. Such compounds include the 3-formoxy-5,7,9(11)-pregnatrien-20-one maleic acid, maleic acid anhydride, dimethyl maleate, diethyl maleate, dibutyl maleate, dioctyl maleate, diisopropyl maleate, dibenzyl maleate, and like adduct; the corresponding 3-propionoxy, butyroxy, valeroxy, hexanoyloxy, heptanoyloxy octanoyloxy, benzoyloxy, and similar 20-ketone adducts, including, for example, 3-propionoxy-5,7,9(11)-pregnatrien-20-one dipropyl maleate, 3-benzoyloxy-5,7,9(11)-pregnatrien-20-one dibenzyl maleate, 3-heptanoyloxy-5,7,9(11)-pregnatrien-20-one dimethyl maleate, 3-valeroyloxy-5,7,9(11)-pregnatrien-20-one maleic acid anhydride adducts, and the like.

PREPARATION 19.—DIMETHYL MALEATE ADDUCT OF 3-BETA-ACETOXY-9,11-OXIDO-5,7-PREGNADIEN-20-ONE

One gram (0.002 mole) of the dimethyl maleate adduct of 3-beta-acetoxy-5,7,9(11)-pregnatrien-20-one was dissolved in 25 milliliters of glacial acetic acid, and a solution of one milliliter of thirty percent hydrogen peroxide (four molar equivalents) in six milliliters of glacial acetic acid was added thereto at room temperature. The reaction mixture was heated on the steam bath for four hours, and thereafter allowed to stand at room temperature overnight. The mixture was then poured into 300 milliliters of water, the resulting precipitate separated by filtration, washed with water, and dried. The yield was 810 milligrams of the oxido compound melting at 197–206 degrees centigrade. After five recrystallizations from methanol and acetone-hexane, the dimethyl maleate adduct of 3-beta-acetoxy-9,11-oxido-5,7-pregnadien-20-one melted at 216–221 degrees centigrade, $[alpha]_D^{26} + 11.4$ degrees (in chloroform).

Analysis:
Calculated for $C_{29}H_{38}O_8$: % C, 67.68; % H, 7.44
Found: % C, 67.74; % H, 7.35
68.02   7.49

PREPARATION 20.—MALEIC ANHYDRIDE ADDUCT OF 3-BETA-ACETOXY-9,11-OXIDO-5,7-PREGNADIEN-20-ONE

Five grams (0.011 mole) of the maleic anhydride adduct of 3-beta-acetoxy-5,7,9(11)-pregnatrien-20-one was dissolved in 120 milliliters of hot glacial acetic acid, the solution thereafter cooled to room temperature, and a solution of five milliliters of thirty percent hydrogen peroxide (four molar equivalents) in thirty milliliters of glacial acetic acid added dropwise thereto with swirling. The reaction mixture was heated on the steam bath for three and one-half hours. The colorless solution was allowed to stand at room temperature overnight, poured into about one liter of water, the resulting precipitate separated by filtration, washed with water, and dried in a vacuum desiccator. The yield was 4.88 grams (94.8 percent), melting at 232–246 degrees centigrade. After two recrystallizations from acetone, crystals of the maleic anhydride adduct of 3-beta-acetoxy-9,11-oxido-5,7-pregnadien-20-one, melting at 240–246 degrees centigrade, were obtained.

Analysis:
Calculated for $C_{27}H_{32}O_7$: % C, 69.21; % H, 6.89
Found: % C, 69.43; % H, 6.94
69.30   6.97

PREPARATION 21.—MALEIC ANHYDRIDE ADDUCT OF 3-BETA-ACETOXY-9,11-OXIDO-5,7-PREGNADIEN-20-ONE

A solution of fifty grams of the maleic anhydride adduct of 3-beta-acetoxy-5,7,9(11)-pregnatrien-20-one in 1200 milliliters of glacial acetic acid was prepared by heating the ingredients together on a steam bath. The mixture was then cooled below forty degrees centigrade and fifty milliliters of thirty percent hydrogen peroxide in 300 milliliters of glacial acetic acid added thereto. The mixture was then heated on the steam bath for one hour at a temperature of 85 degrees centigrade or above, and was then poured into three to five volumes of ice and water. The yield was 47.7 grams (92 percent), melting point 238–243 degrees centigrade, $[alpha]_D^{25} + 31.1$ degrees in chloroform. The product was dissolved in methylene chloride and precipitated by addition of ether to give 37.7 grams of purified product having a melting point of 254 to 259 degrees centigrade $[alpha]_D^{25} + 33.2$ degrees (in chloroform).

PREPARATION 22.

In the same manner as given above for the preparation of 3-beta-acetoxy-9,11-oxido-5,7-pregnadien-20-one maleic anhydride adduct, the following compounds were prepared:

(1) Maleic anhydride adduct of 3-benzoyloxy-9,11-oxido-5,7-pregnadien-20-one; M. P. 258–260 degrees centigrade, $[alpha]_D^{26} + 24.4$ degrees (in chloroform).

Analysis:
Calculated for $C_{32}H_{34}O_7$: % C, 72.43; % H, 6.46
Found: % C, 72.62; % H, 6.42
72.70   6.38

(2) Maleic anhydride adduct of 3-heptanoyloxy-9,11-oxido-5,7-pregnadien-20-one, M. P. 168–169.5 degrees centigrade, $[alpha]_D^{26} + 26.1$ degrees (in chloroform).

Analysis:
Calculated for $C_{32}H_{41}O_7$: % C, 71.48; % H, 7.69
Found: % C, 71.27; % H, 7.43
71.44   7.65

PREPARATION 23.—MALEIC ACID ADDUCT OF 3-BETA-HYDROXY-9,11-OXIDO-5,7-PREGNADIEN-20-ONE

Approximately 445 milliliters of five percent sodium hydroxide solution was added to 22.26 grams of 3-beta-acetoxy-9,11-oxido-5,7-pregnadien-20-one maleic anhydride adduct in a one-liter Erlenmeyer flask, and the mixture stirred until the solid had gone into solution. About 185 milliliters of ten percent hydrochloric acid was then added at room temperature or below, until the mixture was acid to Congo red paper, whereupon the hydroxy diacid began to precipitate. Upon cooling the flask overnight, filtering and air-drying the product at room temperature, a yield of 19.4 grams of desired 3-beta-hydroxy-9,11-oxido-5,7-pregnadien-20-one maleic acid adduct, melting at 229–233 degrees centigrade with decomposition was obtained. An additional crop of crystals was obtained by concentration of the mother liquor.

The same product is obtained by epoxidation of the 9,11 double bond of 3-beta-hydroxy-5,7,9(11)-pregnatrien-20-one maleic acid adduct with hydrogen peroxide in the manner of the preceding preparations, using a glacial acetic acid medium.

PREPARATION 24.—MALEIC ANHYDRIDE ADDUCT OF 3-BETA-HYDROXY-9,11-OXIDO-5,7-PREGNADIEN-20-ONE 3-beta-hydroxy-9,11-oxido-5,7-pregnadien-20-one maleic acid adduct (19.4 grams) was placed in a vacuum oven and heated for ten hours at 137–140 degrees centigrade under a pressure of only one-half millimeter of mercury. The yield of desired anhydride, which melts at 233 to 240 degrees centigrade with decomposition, was quantitative.

The same product is obtained by epoxidation of the 9,11 double bond of 3-beta-hydroxy-5,7,9(11)-pregnatrien-20-one maleic anhydride adduct with hydrogen peroxide in the manner of the preceding preparations, using a glacial acetic acid medium.

PREPARATION 25.—MONOMETHYL MALEATE OF 3-BETA-HYDROXY-9,11-OXIDO-5,7-PREGNADIEN-20-ONE

A solution of five grams of the maleic anhydride adduct of 3-beta-acetoxy-9,11-oxido-5,7-pregnadien-20-one in 145 milliliters of methanol and a solution of five grams of sodium hydroxide in 25 milliliters of water were mixed and the mixture allowed to stand for one hour, whereafter 145 milliliters of water was added, the mixture allowed to stand for seven hours, then made acid with three normal hydrochloric acid and placed in the refrigerator. The mixture was then extracted with methylene chloride, washed with sodium chloride, and dried over sodium sulfate. The yield was 4.93 grams, melting point 130–160 degrees centigrade. After recrystallization three times from a solution of chloroform, methanol, and ether, the melting point was 193–198 degrees centigrade, $[alpha]_D^{25}+19.4$ degrees (in chloroform).

Analysis:
Calculated for $C_{26}H_{34}O_7$:
% C, 68.10; % H, 7.47; % OCH$_3$, 6.76
Found:
% C, 67.90; % H, 7.14; % OCH$_3$, 6.22
67.97      7.35            6.12

The same product is obtained by epoxidation of the 9,11 double bond of 3-beta-hydroxy-5,7,9(11)-pregnatrien-20-one monomethyl maleate with hydrogen peroxide according to the manner of the preceding preparations.

PREPARATION 26.—DIMETHYL MALEATE OF 3-BETA-HYDROXY-9,11-OXIDO-5,7-PREGNADIEN-20-ONE

A suspension of 0.65 gram of the monomethyl ester of the maleic acid adduct of 3-beta-hydroxy-9,11-oxido-5,7-pregnadien-20-one in twenty milliliters of anhydrous ether was treated with an excess of diazomethane in methylene chloride solution. On addition of methylene chloride the compound went into solution, and was allowed to stand about two hours, the solution evaporated to dryness, and the residue dissolved in twelve milliliters of hot ethanol, filtered, concentrated, water added, and the solution placed in the refrigerator. The precipitate was separated by filtration, to give a yield of 0.54 gram, melting at 207–211 degrees centigrade. The product was passed over a column of alumina for purification, and this procedure yielded 0.5 gram of product, which upon crystallization from methanol had a melting point of 210–212 degrees centigrade, $[alpha]_D^{26}+15.4$ degrees (in chloroform).

Analysis:
Calculated for $C_{27}H_{36}O_7$:
% C, 68.62; % H, 7.68; % OCH$_3$, 13.13
Found:
% C, 68.62; % H, 7.61; % OCH$_3$, 12.10
68.61      7.64            12.22

Infra red analysis was in agreement with the structure proposed.

The same product is obtained by epoxidation of the 9,11 double bond of 3-beta-hydroxy-5,7,9(11)-pregnatrien-20-one dimethyl maleate with hydrogen peroxide according to the method of the preceding preparations, or from the corresponding diacid or anhydride in methanol by treatment with diazomethane in methylene chloride.

Other adducts of 3-hydroxy- and 3-acyloxy-9,11-oxido-5,7-pregnadien-20-one include 3-propionoxy-9,11-oxido-5,7-pregnadien-20-one maleic acid adduct, 3-butyroxy-9,11-oxido-5,7-pregnadien-20-one maleic anhydride adduct, 3-formoxy-9,11-oxido-5,7-pregnadien-20-one dimethyl maleate adduct, 3-formoxy-9,11-oxido-5,7-pregnadien-20-one maleic anhydride adduct, 3-acetoxy-9,11-oxido-5,7-pregnadien-20-one maleic acid adduct, 3-propionoxy-9,11-oxido-5,7-pregnadien-20-one dimethyl maleate adduct, 3-butyroxy-9,11-oxido-5,7-pregnadien-20-one diethyl maleate adduct, 3-octanoyloxy-9,11-oxido-5,7-pregnadien-20-one dioctyl maleate adduct, 3-benzoyloxy-9,11-oxido-5,7-pregnadien-20-one maleic acid adduct, 3-propionoxy-9,11-oxido-5,7-pregnadien-20-one maleic anhydride adduct, and the like, which are prepared in the same manner as given above, by epoxidation of the selected 9,11-unsaturated starting compound.

PREPARATION 27.—3,9,11-TRIACETOXY-5,7-PREGNADIEN-20-ONE MALEIC ANHYDRIDE ADDUCT

To a one-liter three-neck round-bottom flask equipped with stirrer and thermometer, immersed in an ice-salt bath, were added eight grams of 3-beta-acetoxy-9,11-oxido-5,7-pregnadien-20-one maleic anhydride adduct and 400 milliliters of acetic anhydride (Merck reagent grade). After solution was complete and after the inside temperature had dropped to between zero and four degrees centigrade, sixteen drops of anhydrous stannic chloride was added thereto. The reaction was allowed to continue for 45 minutes with stirring, and, at the end of this time, the reaction mixture was poured into three liters of ice and water. The ice and water mixture was stirred until all of the acetic anhydride had hydrolyzed and the product had precipitated as white platelets. The white product was filtered off and dried: weight 9.42 grams, M. P. 205–215 degrees centigrade. Two recrystallizations from acetone-isopropyl ether mixture gave 4.2 grams, M. P. 228–234 degrees centigrade (tube), 265–270 degrees centigrade, with softening at 235 degrees centigrade (block); [alpha]$_D^{27}$—84.7 degrees (chloroform). The yield was 43 percent.

Analysis:

Calculated: C, 65.24; H, 6.71
Found:    C, 65.26; H, 6.72
           65.26    6.72

PREPARATION 28.—3- BENZOYLOXY-9,11- DIACETOXY-5,7-PREGNADIEN-20-ONE MALEIC ANHYDRIDE ADDUCT

In exactly the same manner as given in Preparation 27, this compound is prepared from 3-benzoyloxy-9,11-oxido - 5,7-pregnadien-20-one maleic anhydride adduct (Preparation 22).

PREPARATION 29.—3 - HEPTANOYLOXY - 9,11 - DIACETOXY-5,7-PREGNADIEN-20-ONE MALEIC ANHYDRIDE ADDUCT

In exactly the same manner as given in Preparation 27, this compound is prepared from 3-heptanoyloxy - 9,11-oxido - 5,7-pregnadien-20-one maleic anhydride adduct (Preparation 22).

PREPARATION 30.—3,9,11-TRIACETOXY-5,7-PREGNADIEN-20-ONE DIMETHYL MALEATE ADDUCT

In exactly the same manner as given in Preparation 27, this compound is prepared from 3-acetoxy-9,11-oxido-5,7 - pregnadien - 20-one dimethyl maleate adduct (Preparation 19).

PREPARATION 31.—3-ACETOXY -9,11- DIPROPIONOXY-5,7-PREGNADIEN-20-ONE MALEIC ANHYDRIDE ADDUCT

In exactly the same manner as given in Preparation 27, this compound is prepared from 3-acetoxy-9,11-oxido-5,7-pregnadien-20-one maleic anhydride adduct using an excess of propionic anhydride and stannic chloride catalyst.

Other 3,9,11-triacyloxy-5,7-pregnadien-20-one adducts include 3-acetoxy-9,11-dibutyroxy-5,7-pregnadien-20-one, 3-benzoyloxy-9,11-dipropionoxy-5,7-pregnadien-20-one, and 3-propionoxy-9,11-diacetoxy-5,7-pregnadien-20-one maleic anhydride, maleic acid, and maleic acid dimethyl, diethyl, dipropyl, diisopropyl, dibutyl, diamyl, dihexyl, diheptyl, dioctyl and like diester adducts, and the like, all of which are prepared by reaction of a suitable corresponding 3-hydroxy or 3-acyloxy-9,11 - oxido-5,7 - pregnadien-20-one adduct with a lower-aliphatic acid anhydride in the presence of stannic chloride catalyst, as illustrated by the foregoing preparations.

Example 1.—3,9,11-trihydroxy-5,7-pregnadien-20-one maleic acid adduct disodium salt The maleic anhydride adduct of 3-beta,9,11-triacetoxy-5,7-pregnadien-20-one (11.05 gram) was dissolved in 200 milliliters of purified dioxane by heating. To this solution was added 250 milliliters of two normal sodium hydroxide solution at room temperature and the mixture diluted with an additional fifty milliliters of water, making approximately a one normal solution of sodium hydroxide. This was allowed to stand at room temperature for two hours, at the end of which time formation of the 3,9,11-trihydroxy-5,7-pregnadien-20-one maleic acid adduct disodium salt was complete. Use of potassium hydroxide in place of sodium hydroxide is productive of the dipotassium salt.

Example 1a.—3,9,11-trihydroxy-5,7-pregnadien-20-one maleic acid adduct disodium salt In the same manner as given in Example 1, this compound is prepared from the compound of Preparation 28, 3-benzoyloxy-9,11-diacetoxy-5,7-pregnadien-20-one maleic anhydride adduct, by saponification with dilute sodium hydroxide solution Example 1b.—3,9,11-trihydroxy-5,7-pregnadien-20-one maleic acid adduct disodium salt In the same manner as given in Example 1, this compound is prepared from the compound of Preparation 29, 3-heptanoyloxy-9,11-acetoxy 5,7-pregnadien-20-one maleic anhydride adduct, by saponification with dilute sodium hydroxide solution.

Example 1c.—3,9,11-trihydroxy-5,7 - pregnadien-20-one maleic acid adduct disodium salt In the same manner as given in Example 1, this compound is prepared from the compound of Preparation 30, 3,9,11-triacetoxy-5,7-pregnadien-20-one dimethyl maleate adduct, by saponification with dilute sodium hydroxide solution.

Example 1d.—3,9,11-trihydroxy-5,7 - pregnadien-20-one maleic acid adduct disodium salt In the same manner as given in Example 1, this compound is prepared from the compound of Preparation 31, 3-acetoxy-9,11-dipropionoxy-5,7-pregnadien-20-one maleic anhydride adduct, by saponification with dilute sodium hydroxide solution.

Example 1e.—3,9,11-trihydroxy-5,7 - pregnadien-20-one maleic acid adduct dipotassium salt In the same manner as given in Example 1, this compound is prepared from 3,9,11-triacetoxy-5,7-pregnadien-20-one maleic acid adduct which in turn is prepared from the compound of Preparation 27, 3,9,11-triacetoxy-5,7-pregnadien-20-one maleic anhydride adduct by careful saponification with two molar equivalents of sodium hydroxide and careful neutralization with dilute hydrochloric acid, by saponification with dilute potassium hydroxide solution.

Example 2. — 3,9,11-trihydroxy-5,7-pregnadien-20-one maleic acid adduct

The reaction mixture from Example 1 was partially neutralized by addition of 100 milliliters of three normal hydrochloric acid and then evaporated in vacuo at forty degrees centigrade to a volume of 310 milliliters, thereby removing all dioxane. The reaction mixture was then made acid to Congo red paper by adding eighty milliliters of three normal hydrochloric acid, and placed in the refrigerator for several hours. The yield of crude product was 71.5 percent. This was redissolved in forty milliliters of 0.5 normal sodium hydroxide, diluted to 200 milliliters with water, made acid with 45 milliliters of one normal hydrochloric acid, and cooled. The yield was 5.62 grams of white needles, M. P. 255–264 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound selected from the group consisting of (a) 3,9,11-trihydroxy-5,7-pregnadien-20-one 5,8-maleic acid adduct and (b) di-alkali-metal salts thereof, said compounds having the formula:

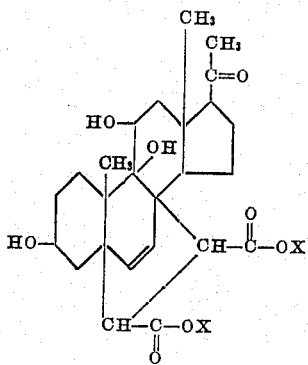

wherein X is selected from the group consisting of hydrogen and an alkali metal.

2. 3,9,11 - trihydroxy - 5,7 - pregnadien-20-one 5,8-maleic acid adduct.

3. 3,9,11 - trihydroxy - 5,7 - pregnadien-20-one 5,8-disodium maleate adduct.

4. The process which comprises: saponifying a starting 3,9,11-triacyloxy-5,7-pregnadien-20-one 5,8-adduct of the formula:

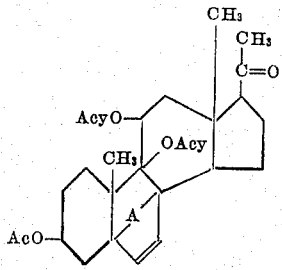

wherein Ac is an acyl group which is the residue of a carboxylic organic acid containing from one to eight carbon atoms, inclusive, wherein Acy is an acyl group which is the residue of a lower-aliphatic organic acid containing from one to eight carbon atoms, inclusive, and wherein A is the adduct radical of a dienophile selected from the group consisting of maleic acid, maleic anhydride, and maleic acid diesters containing from one to eight carbon atoms, inclusive, in the esterifying group, in solution in an organic solvent which is non-reactive under the conditions of reaction, by mixing therewith a solution of an alkali metal hydroxide, to produce a 3,9,11-trihydroxy-5,7-pregnadien-20-one 5,8-maleic acid adduct di-alkali-metal salt.

5. The process of claim 4, wherein the alkali metal hydroxide solution is a sodium hydroxide solution.

6. The process of claim 4, wherein about five molar equivalents of the alkali metal hydroxide solution is employed.

7. The process of claim 4, wherein the organic solvent is dioxane.

8. The process of claim 4, wherein the starting compound is 3,9,11-triacetoxy-5,7-pregnadien-20-one maleic anhydride adduct and wherein about five molar equivalents of the alkali metal hydroxide solution is employed.

9. The process which comprises: saponifying a starting 3,9,11-triacyloxy-5,7-pregnadien-20-one 5,8-adduct of the formula:

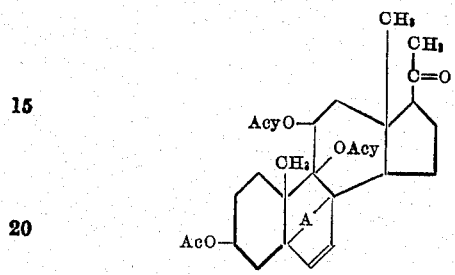

wherein Ac is an acyl group which is the residue of a carboxylic organic acid containing from one to eight carbon atoms, inclusive, wherein Acy is an acyl group which is the residue of a lower-aliphatic organic acid containing from one to eight carbon atoms, inclusive, and wherein A is the adduct radical of a dienophile selected from the group consisting of maleic acid, maleic anhydride, and maleic acid diesters containing from one to eight carbon atoms, inclusive, in the esterifying group, in solution in an organic solvent which is non-reactive under the conditions of reaction, by mixing therewith a solution of an alkali metal hydroxide, to produce a 3,9,11-trihydroxy-5,7-pregnadien-20-one 5,8-maleic acid adduct di-alkali-metal salt; and converting the di-alkali-metal salt thus produced to the free 3,9,11-trihydroxy-5,7-pregnadien-20-one 5,8-maleic acid adduct by neutralizing with an aqueous mineral acid.

10. The process of claim 9, wherein about five molar equivalents of the alkali metal hydroxide solution is employed.

11. The process of claim 9, wherein about five molar equivalents of the alkali metal hydroxide solution is employed, wherein the organic solvent is dioxane.

12. The process of claim 9, wherein the starting compound is 3,9,11-triacetoxy-5,7-pregnadien-20-one maleic anhydride adduct and wherein about five molar equivalents of the alkali metal hydroxide solution is employed, and wherein the aqueous mineral acid is hydrochloric acid.

PAUL E. MARLATT.
ARTHUR R. HANZE.
A VERN McINTOSH, Jr.
ROBERT H. LEVIN.

No references cited.